Figure 1:
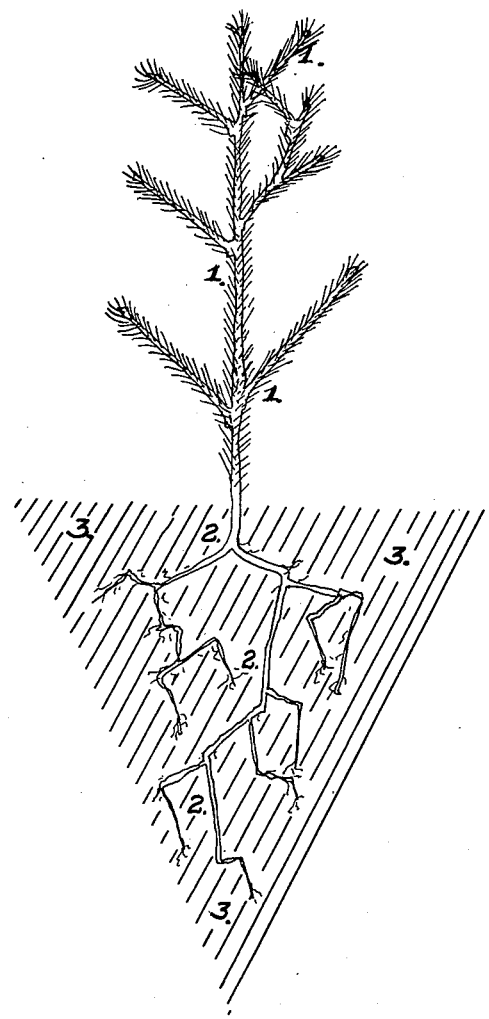

April 8, 1952  J. C. McKENNA, JR  2,592,052
METHOD OF PLANTING
Filed Oct. 12, 1948

Patented Apr. 8, 1952

2,592,052

UNITED STATES PATENT OFFICE 2,592,052

METHOD OF PLANTING

John C. McKenna, Jr., Madison, Wis.

Application October 12, 1948, Serial No. 54,031

2 Claims. (Cl. 47—58)

This invention relates to improvements in preparing rooted plants such as tree seedlings for planting.

It is an object of the present invention to provide for the planting of rooted plants without the customary necessity of excavating and then filling and subsequently watering and fertilizing after the planting has been completed. The invention is particularly applicable to the reforestation of cut over areas and further avoids the customary necessity, as heretofore, of clearing the land of stubble and growth and plowing the land in furrows to receive the seedlings.

It is another object of the invention to provide for extremely facile and rapid planting and transplanting and, further, to subject each plant to uniform conditions of moisture and fertilization, where desired.

A further object is to provide a novel composition which consists of a seedling or other rooted plant having its roots substantially imbedded in an inverted wedge-shaped mixture of earth and water, including fertilizer if desired, which is frozen into a solid mass adapted to be readily received in the ground for planting.

Other objects and advantages of the invention will be apparent from the following detailed description taken in conjunction with the accompanying drawings wherein a preferred embodiment of the principles of the invention has been selected for exemplification.

Figure 2:
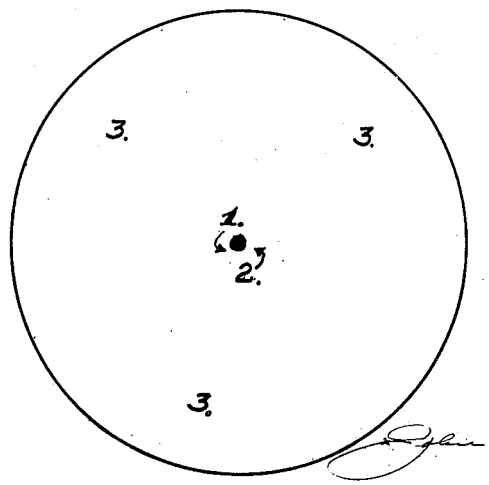

In the drawings:

Fig. 1 is a side elevational view of a seedling composition prepared in accordance with the present invention and showing the rooted base portion in section; and Fig. 2 is a top plan view of the composition shown in Fig. 1.

Referring more particularly to the drawings, wherein like numerals refer to like parts, the rooted plant indicated at 1 may be of any kind or species. The Norway Spruce seedling of the Conifer tree group, as shown, is merely illustrative of any other seedling of the evergreen families, the deciduous tree families, such as the oak and elm, or tree or rooted plant of any other character.

As shown, the roots of the plant 2 are substantially encased in a frozen mixture 3 of earth and water to which fertilizer may be added if desired. As a critical feature of the present invention, the solid mass 3 is of downwardly directed conical or other wedge-like configuration which may be readily forced or dropped by gravity into the ground a depth sufficiently to imbed the roots 2 for planting. It will be apparent that, upon melting, the water component of the mixture will provide the moisture necessary for growth of the plant in the decomposed earth or mixture of earth and added fertilizer.

The composition illustrated may be prepared in any feasible manner. For example, the roots of the plant including the primary root, rootlets and root hairs, may be planted in a conical or wedge-shaped container formed of fabric, paper or any other desired material, preferably of a permeable or soluble character adapted substantially to disintegrate when imbedded in the ground. Water may then be added to the earth or mixture of earth and fertilizer in the container and the resulting fluid mass subjected to freezing conditions to provide a solid inverted wedge-shaped or conical body. Under certain conditions, where it is not necessary to include the container in the final composition, the roots may be planted in a wedge-shaped or conical mold containing earth or a mixture of earth and fertilizer to which water is added, and the resulting mass then removed from the mold after freezing.

There is no particularly critical relationship between the sizes of the plant and the wedge-shaped body containing the roots which may vary according to the specific plant to be treated and the conditions under which it is to be planted. In general, the size of the body will be determined by the mechanical considerations of encasing or substantially encasing the various root elements without undue distortion such as might impair growth of the plant.

The planting or transplanting of the compositions herein described and illustrated may be effected in a number of ways. For example, the frozen parcels may be dropped from airplanes so that the force of gravity will drive the wedge-shaped body into the ground. This is a convenient expedient in the problem of reforestation of extensive areas. Alternatively, planting machines of known character may be employed mechanically to force the solidly frozen body into the ground and, of course, in simple operations, the body may be impressed manually into the ground. Ordinarily no prior excavation will be necessary, the weight of the body coupled with gravitational or mechanical force being usually sufficient to imbed the same into the ground to a depth appropriate for adequate planting.

It will be understood that the particular construction and method herein shown and described are exemplary only of the principles of the invention as defined in the following claims.

Having described my invention what I claim is:

1. The method of planting tree seedlings in relatively soft unexcavated ground which comprises, substantially encasing the roots of the seedling in an inverted wedge-like body of earth admixed with water, solidifying said body by freezing, and forcing the solidified body into the relatively soft unexcavated ground a sufficient distance for adequate planting of the seedling.

2. The method of planting a tree seedling in relatively soft unexcavated ground which comprises, providing a seedling having its roots substantially encased in a frozen inverted wedge-like body of earth and water, and forcing the solidified body into the relatively soft unexcavated ground a sufficient distance for adequate planting of the seedling.

JOHN C. McKENNA, Jr.

REFERENCES CITED

The following references are of record in the file of this patent:

UNITED STATES PATENTS

| Number | Name | Date |
|---|---|---|
| 1,278,217 | Reid | Sept. 10, 1918 |
| 1,599,841 | Sager | Sept. 14, 1926 |
| 1,948,117 | Kadow | Feb. 20, 1934 |
| 1,959,139 | Otwell | May 15, 1934 |
| 2,243,955 | Gwathmey | June 3, 1941 |

FOREIGN PATENTS

| Number | Country | Date |
|---|---|---|
| 42,007 | Norway | Oct. 12, 1925 |
| 195,574 | Switzerland | Apr. 16, 1938 |

OTHER REFERENCES

Bailey: "Standard Cyclopedia of Horticulture," 1943; vol. 1, pp. 1178–1180; vol. 3, pp. 3366, 3367.

Farmers' Bulletin, 1591, published 1929, pages 9, 10, 11, 14, 24–29.

Garden Dictionary, 1938, pp. 622, 623.